(12) United States Patent
Yoshioka et al.

(10) Patent No.: US 12,294,889 B2
(45) Date of Patent: May 6, 2025

(54) TERMINAL AND COMMUNICATION METHOD FOR REQUESTING CHANNEL STATE INFORMATION

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 336 days.

(21) Appl. No.: 17/800,191

(22) PCT Filed: Feb. 21, 2020

(86) PCT No.: PCT/JP2020/007259
§ 371 (c)(1),
(2) Date: Aug. 16, 2022

(87) PCT Pub. No.: WO2021/166268
PCT Pub. Date: Aug. 26, 2021

(65) Prior Publication Data
US 2023/0055200 A1    Feb. 23, 2023

(51) Int. Cl.
*H04W 28/04* (2009.01)
*H04L 1/1812* (2023.01)
(Continued)

(52) U.S. Cl.
CPC ........... *H04W 28/04* (2013.01); *H04L 1/1812* (2013.01); *H04L 1/1893* (2013.01); *H04L 5/0053* (2013.01); *H04W 24/10* (2013.01)

(58) Field of Classification Search
CPC ...... H04W 28/04; H04W 4/40; H04L 1/1812; H04L 1/1893; H04L 5/0053; H04L 24/10;
(Continued)

(56) References Cited

U.S. PATENT DOCUMENTS

2022/0104126 A1* 3/2022 Lee ................... H04W 52/0219
2022/0132333 A1* 4/2022 Mattam ................. H04W 76/30
(Continued)

FOREIGN PATENT DOCUMENTS

JP    2020-025357 A    2/2020

OTHER PUBLICATIONS

International Search Report issued in PCT/JP2020/007259 on Jul. 7, 2020 (5 pages).
(Continued)

*Primary Examiner* — Mewale A Ambaye
(74) *Attorney, Agent, or Firm* — Osha Bergman Watanabe & Burton LLP

(57) ABSTRACT

A terminal includes a transmission unit that transmits a request for channel state information and one or more shared channels including a reference signal to another terminal, a control unit that configures a latency bound for a channel state report triggered by the request, and a reception unit that receives the channel state report triggered by the request, before the latency bound from the other terminal, wherein the control unit performs at least one of: an operation of controlling the channel state report based on reception of a HARQ feedback in a case where the reception unit receives the HARQ feedback corresponding to the request; and an operation of configuring a specific latency bound for each of multiple requests for the channel state information in a case where the transmission unit transmits the multiple requests for the channel state information corresponding to a channel state report event.

6 Claims, 11 Drawing Sheets

(51) Int. Cl.
  *H04L 1/1867* (2023.01)
  *H04L 5/00* (2006.01)
  *H04W 24/10* (2009.01)

(58) Field of Classification Search
  CPC ....... H04L 5/00; H04L 1/0027; H04L 1/0026; H04L 1/1671
  See application file for complete search history.

(56) References Cited

U.S. PATENT DOCUMENTS

| | | | |
|---|---|---|---|
| 2023/0047361 A1* | 2/2023 | Bao | H04W 72/51 |
| 2023/0124012 A1* | 4/2023 | Xue | H04W 72/046 |
| | | | 370/329 |
| 2023/0199687 A1* | 6/2023 | Zhang | H04L 5/0078 |
| | | | 370/277 |
| 2023/0337020 A1* | 10/2023 | Da Silva | H04W 24/04 |

OTHER PUBLICATIONS

Written Opinion of the International Searching Authority issued in PCT/JP2020/007259 on Jul. 7, 2020 (3 pages).
NTT Docomo, Inc.; "Remaining issues on sidelink physical layer procedure"; 3GPP TSG RAN WG1 #100, R1-2000918; e-Meeting; Feb. 24-Mar. 6, 2020 (10 pages).
3GPP TS 38.211 V16.0.0; "3rd Generation Partnership Project; Technical Specification Group Radio Access Network; NR; Physical channels and modulation(Release 16)"; Dec. 2019 (129 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).

* cited by examiner

TERMINAL AND COMMUNICATION METHOD FOR REQUESTING CHANNEL STATE INFORMATION

TECHNICAL FIELD

The present invention relates to a terminal and a measurement method in a radio communication system.

BACKGROUND ART

In LTE (Long Term Evolution) and a successor system of the LTE (for example, LTE-A (LTE-Advanced) and NR (New Radio) (which is also referred to as 5G)), D2D (Device to Device) techniques where terminals perform direct communication with each other without involving a base station are discussed (for example, non-patent document 1).

The D2D reduces traffic between terminals and base stations, and even if the base stations are unable to perform communications in the event of disasters, the D2D enables communication between the terminals. Note that although the D2D is referred to as "sidelink" in 3GPP (3rd Generation Partnership Project), the D2D is used as a more generic terminology in the present specification. However, the sidelink may be used in descriptions of embodiments as stated below if necessary.

The D2D communication is roughly divided into: D2D discovery for discovering other terminals capable of communication; and D2D communication (also referred to as direct communication between terminals or the like) for direct communication between terminals. In the following, when the D2D communication, the D2D discovery or the like are not particularly distinguished, they are simply referred to as D2D. Also, signals transmitted and received in the D2D are referred to as D2D signals. Various use cases of services associated with V2X (Vehicle to Everything) in the NR are being discussed (for example, non-patent document 2).

RELATED ART DOCUMENT

Non-Patent Document

[Non-Patent Document 1] 3GPP TS 38.211 V16.0.0 (2019 December)
[Non-Patent Document 2] 3GPP TR 22.886 V15.1.0 (2017 March)

SUMMARY OF INVENTION

Problem to be Solved by the Invention

In the inter-terminal direct communication in the NR, a CSI (Channel State Information) report is supported. A CSI request and the corresponding CSI-RS are transmitted from a terminal to another terminal, and the other terminal uses the CSI-RS to perform measurement and transmit a CSI report. However, the time limit from the CSI request to the CSI report is not specified, and in a case where the CSI report is delayed, the subsequent data transmission may be delayed.

In the light of the above problem, the present invention aims to clarify the timing of reporting a measurement result in a radio communication system.

Means for Solving the Problem

According to a technique disclosed herein, there is provided a terminal, including: a transmission unit that transmits a request for channel state information and one or more shared channels including a reference signal to another terminal; a control unit that configures a latency bound for a channel state report triggered by the request; and a reception unit that receives the channel state report triggered by the request, before the latency bound from the other terminal, wherein the control unit performs at least one of: an operation of controlling the channel state report based on reception of a HARQ (Hybrid Automatic Repeat Request) feedback in a case where the reception unit receives the HARQ feedback corresponding to the request; and an operation of configuring a specific latency bound for each of multiple requests for the channel state information in a case where the transmission unit transmits the multiple requests for the channel state information corresponding to a channel state report event.

Advantage of the Invention

According to the described technique, it is possible to clarify the timing of reporting a measurement result in a radio communication system.

EMBODIMENTS OF THE INVENTION

Hereinafter, embodiments of the present invention will be described with reference to the drawings. The embodiments described below are merely examples, and embodiments to which the present invention is applied are not limited to the following embodiments.

In operations of a radio communication system of an embodiment of the present invention, conventional techniques are used as needed. Note that the conventional techniques are conventional LTE, for example, but are not limited to the conventional LTE. Also, unless specifically stated otherwise, it should be appreciated that the terminology "LTE" used herein has a broader meaning including LTE-Advanced, its subsequent schemes (e.g., NR), or a wireless LAN (Local Area Network).

In addition, in the embodiment of the invention, a duplexing scheme may be Time Division Duplexing (TDD), may be Frequency Division Duplexing (FDD), or may be other schemes (for example, Flexible Duplexing or the like).

Also, in embodiments of the present invention, "configuring" a radio parameter or the like may mean that a predetermined value is preconfigured or that a radio parameter indicated by the base station 10 or the terminal 20 is configured.

Figure 1:
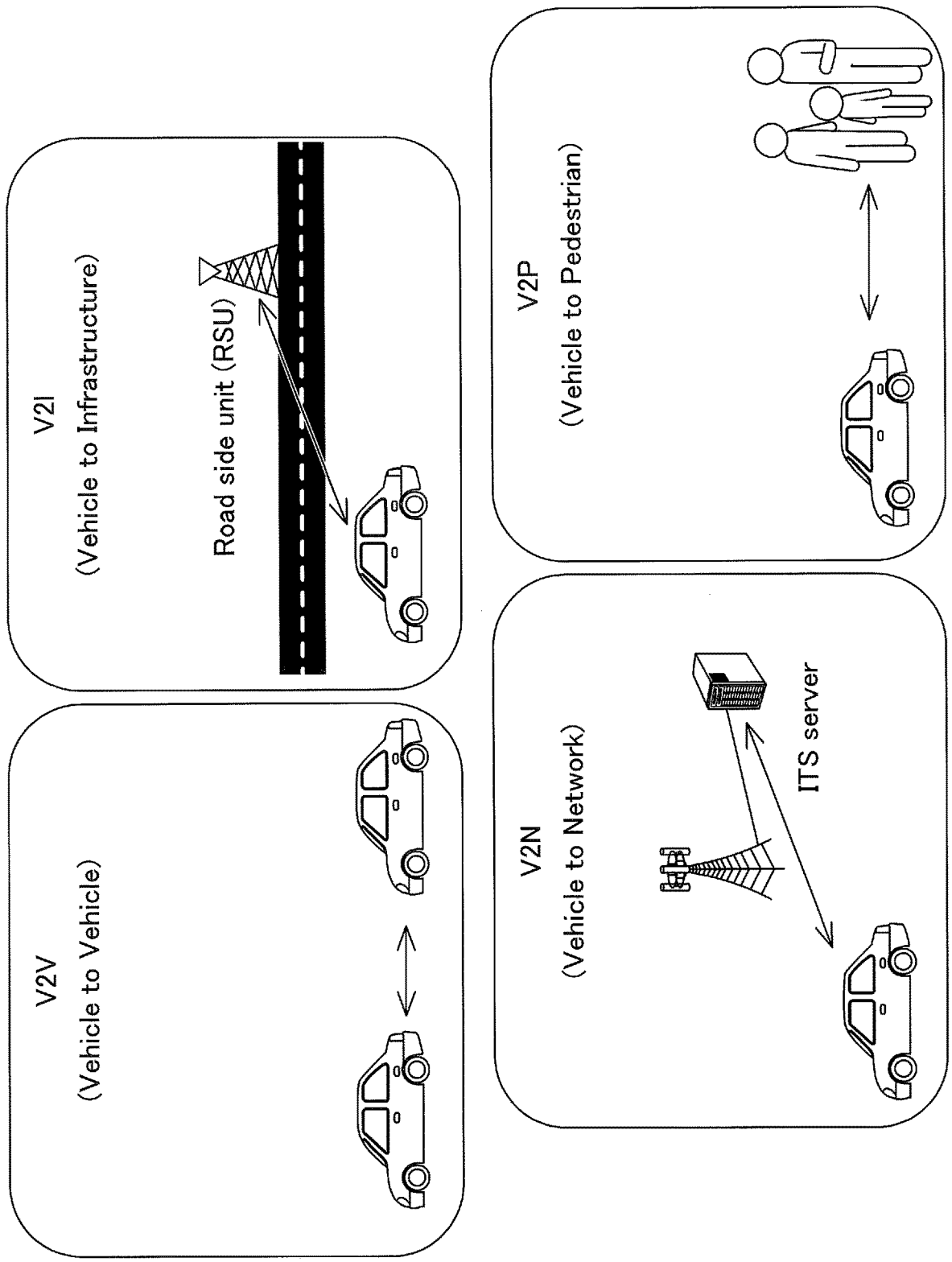
FIG. 1 is a diagram illustrating V2X.

FIG. 1 is a diagram illustrating V2X. In 3GPP, it is considered that V2X (Vehicle to Everything) or eV2X (enhanced V2X) are implemented through enhancement of D2D functions, and the specifications are being developed. As illustrated in FIG. 1, the V2X is a part of ITS (Intelligent Transport Systems) and is a collective term for V2V (Vehicle to Vehicle), which means the form of communication between vehicles, V2I (Vehicle to Infrastructure), which means the form of communication between a vehicle and a RSU (Road-Side Unit) located at a roadside, V2N (Vehicle to Network), which means the form of communication between a vehicle and an ITS server, and V2P (Vehicle to Pedestrian), which means the form of communication between a vehicle and a mobile terminal carried by a pedestrian.

Also, V2X utilizing cellular communication and inter-terminal communication of LTE or NR is being discussed in the 3GPP. The V2X utilizing cellular communication may be referred to as cellular V2X. In the V2X of the NR, implementations of large capacity, low delay, high reliability and QoS (Quality of Service) control are discussed.

It is expected that discussions of V2X of LTE or NR will not be limited to the 3GPP specifications in the future. For example, it is expected that interoperability, cost reduction by implementation of an upper layer, combination or switching manner of multiple RATS (Radio Access Technology), regulatory compliance in respective countries, data acquisition, distribution, database management and use of V2X platforms of LTE or NR will be discussed.

In embodiments of the present invention, a communication device is mainly assumed to be installed in a vehicle, the embodiments of the present invention are not limited to those embodiments. For example, the communication device may be a terminal carried by a person, a device installed in a drone or an aircraft, a base station, an RSU, a relay node, a terminal having scheduling capabilities and so on.

Note that a SL (Sidelink) may be differentiated from an UL (Uplink) or a DL (Downlink), based on one of, or combinations of, 1) to 4) below. Also, the SL may be referred to as other names.
1) Resource arrangement of a time domain
2) Resource arrangement of a frequency domain
3) Synchronization signal to be referenced (including SLSS (Sidelink Synchronization Signal))
4) Reference signal used for pathloss measurement for transmit power control Also, regarding OFDM (Orthogonal Frequency Division Multiplexing) of the SL or the UL, any of CP-OFDM (Cyclic-Prefix OFDM), DFT-S-OFDM (Discrete Fourier Transform-Spread-OFDM), OFDM without transform precoding or OFDM with transform precoding may be applied. Also, the SL may be operated under a multicarrier environment.

In the SL of the LTE, Mode 3 and Mode 4 regarding SL resource allocation to a terminal 20 are defined. In Mode 3, transmission resources are dynamically allocated by DCI (Downlink Control Information) transmitted from a base station 10 to the terminal 20. Also, SPS (Semi Persistent Scheduling) is enabled in Mode 3. In Mode 4, the terminal 20 autonomously selects transmission resources from a resource pool.

Note that a slot according to an embodiment of the present invention may be replaced with a symbol, a mini-slot, a subframe, a radio frame or a TTI (Transmission Time Interval). Also, a cell according to an embodiment of the present invention may be replaced with a cell group, a carrier component, a BWP, a resource pool, a resource, a RAT (Radio Access Technology), a system (including a wireless LAN) or the like.

Figure 2:
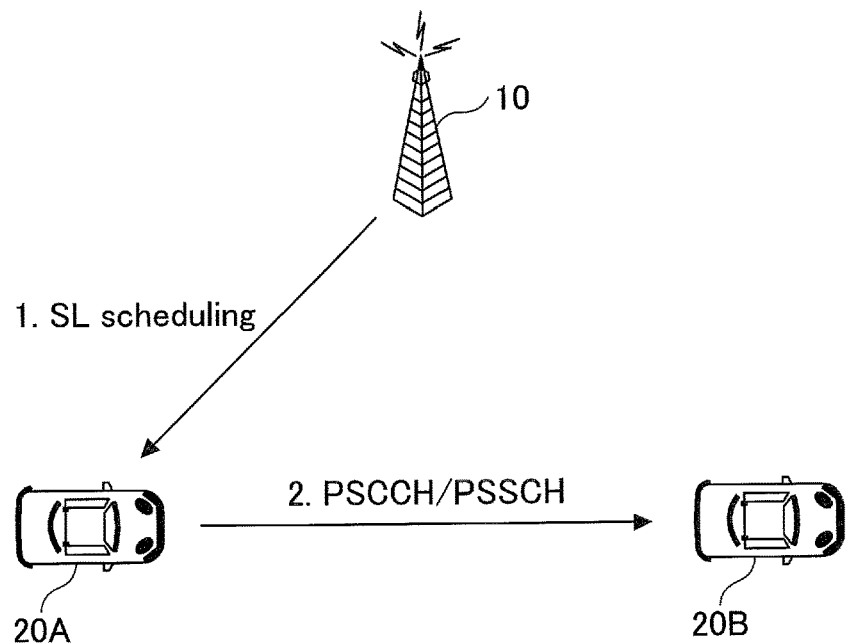
FIG. 2 is a diagram illustrating an example (1) of a transmission mode of the V2X.

FIG. 2 is a diagram illustrating an example (1) of a transmission mode for the V2X. In the transmission mode for sidelink communication illustrated in FIG. 2, at step 1, the base station 10 transmits a scheduling for a sidelink to the terminal 20A. Then, the terminal 20A transmits a PSCCH (Physical Sidelink Control Channel) and a PSSCH (Physical Sidelink Shared Channel) to the terminal 20B based on the received scheduling (step 2). The transmission mode of the sidelink communication illustrated in FIG. 2 may be referred to as sidelink transmission mode 3 for the LTE. In the sidelink transmission mode 3 for the LTE, Uu based sidelink scheduling is performed. The Uu means a radio interface between a UTRAN (Universal Terrestrial Radio Access Network) and a UE (User Equipment). Note that the transmission mode for the sidelink communication illustrated in FIG. 2 may be referred to as sidelink transmission mode 1 for the NR.

Figure 3:
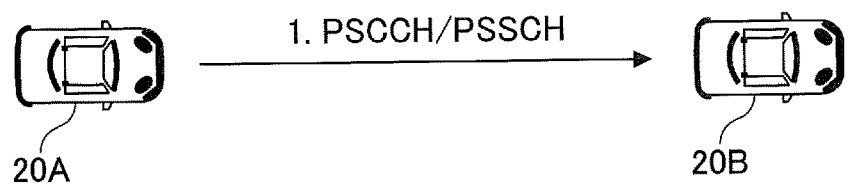
FIG. 3 is a diagram illustrating an example (2) of a transmission mode of the V2X.

FIG. 3 is a diagram illustrating an example (2) of a transmission mode for the V2X. In the transmission mode for the sidelink communication illustrated in FIG. 3, at step 1, the terminal 20A uses autonomously selected resource to transmit a PSCCH and a PSSCH to the terminal 20B. The transmission mode for the sidelink communication illustrated in FIG. 3 may be referred to as sidelink transmission mode 4 for the LTE. In sidelink transmission mode 4 for the LTE, the UE itself performs resource selection.

Figure 4:
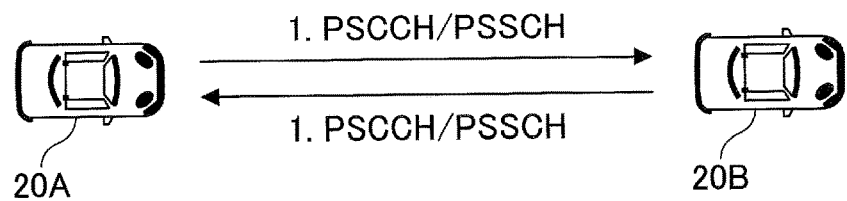
FIG. 4 is a diagram illustrating an example (3) of a transmission mode of the V2X.

FIG. 4 is a diagram illustrating an example (3) of a transmission mode for the V2X. In a transmission mode for the sidelink communication illustrated in FIG. 4, at step 1, the terminal 20A uses an autonomously selected resource to transmit a PSCCH and a PSSCH to the terminal 20B. Likewise, the terminal 20B uses an autonomously selected resource to transmit a PSCCH and a PSSCH to the terminal 20A (step 1). The transmission mode for the sidelink communication illustrated in FIG. 4 may be referred to as sidelink transmission mode 2$a$ for the NR. In the sidelink transmission mode 2 for the NR, the terminal 20 itself performs resource selection.

Figure 5:
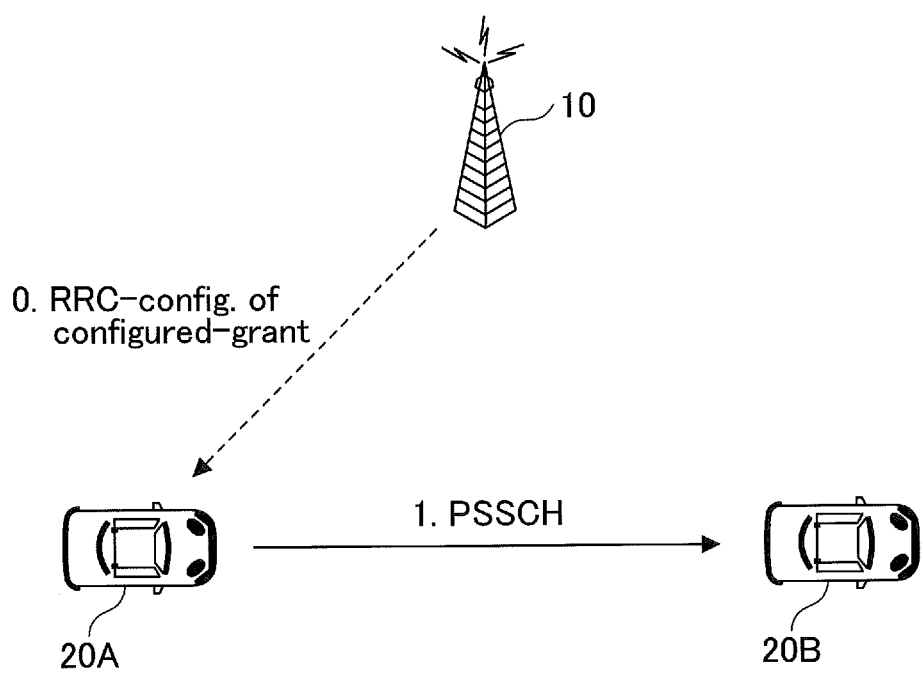
FIG. 5 is a diagram illustrating an example (4) of a transmission mode of the V2X.

FIG. 5 is a diagram illustrating an example (4) of a transmission mode for the V2X. In the transmission mode for the sidelink communication illustrated in FIG. 5, at step 0, the base station 10 transmits a sidelink grant to the terminal 20A via an RRC (Radio Resource Control) configuration. Then, the terminal 20A transmits a PSSCH to the terminal 20B via received resource pattern (step 1). The transmission mode for the sidelink communication illustrated in FIG. 5 may be referred to as sidelink transmission mode 2c for the NR.

Figure 6:
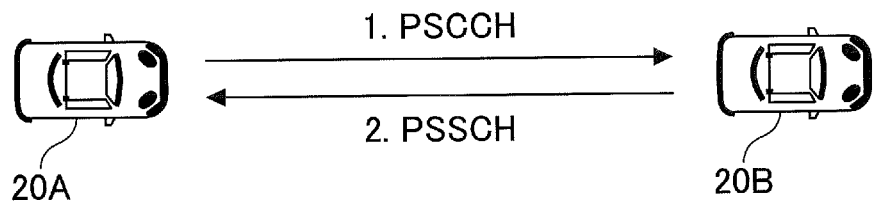
FIG. 6 is a diagram illustrating an example (5) of a transmission mode of the V2X.

FIG. 6 is a diagram illustrating an example (5) of a transmission mode for the V2X. In a transmission mode for the sidelink communication illustrated in FIG. 6, at step 1, the terminal 20A transmits a sidelink scheduling to the terminal 20B via a PSCCH. Then, the terminal 20B transmits a PSSCH to the terminal 20A based on the received scheduling (step 2). The transmission mode for the sidelink communication illustrated in FIG. 6 may be referred to as sidelink transmission mode 2d for the NR.

Figure 7:
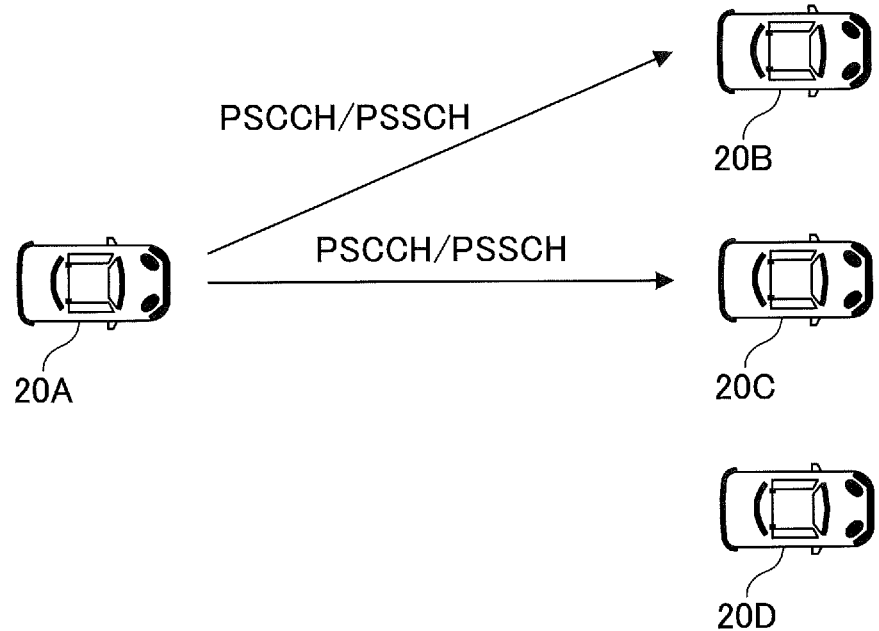
FIG. 7 is a diagram illustrating an example (1) of a communication type of the V2X.

FIG. 7 is a diagram illustrating an example (1) of a communication type of the V2X. The sidelink communication type illustrated in FIG. 7 is a unicast. The terminal 20A transmits a PSCCH and a PSSCH to the terminal 20. In the example illustrated in FIG. 7, the terminal 20A performs unicast for the terminal 20B and also performs a unicast for the terminal 20C.

Figure 8:
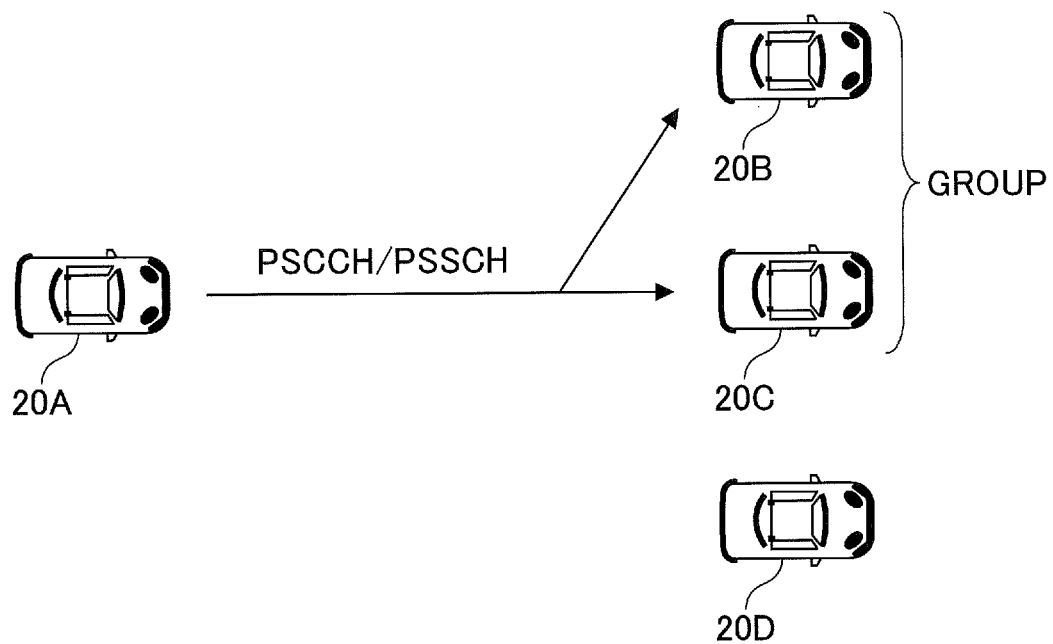
FIG. 8 is a diagram illustrating an example (2) of a communication type of the V2X.

FIG. 8 is a diagram illustrating an example (2) of a communication type for the V2X. The sidelink communication type illustrated in FIG. 8 is a groupcast. The terminal 20A transmits a PSCCH and a PSSCH to a group to which one or more terminals 20 belong. In the example illustrated in FIG. 8, the group includes the terminals 20B and 20C, and the terminal 20A performs a groupcast to the group.

Figure 9:
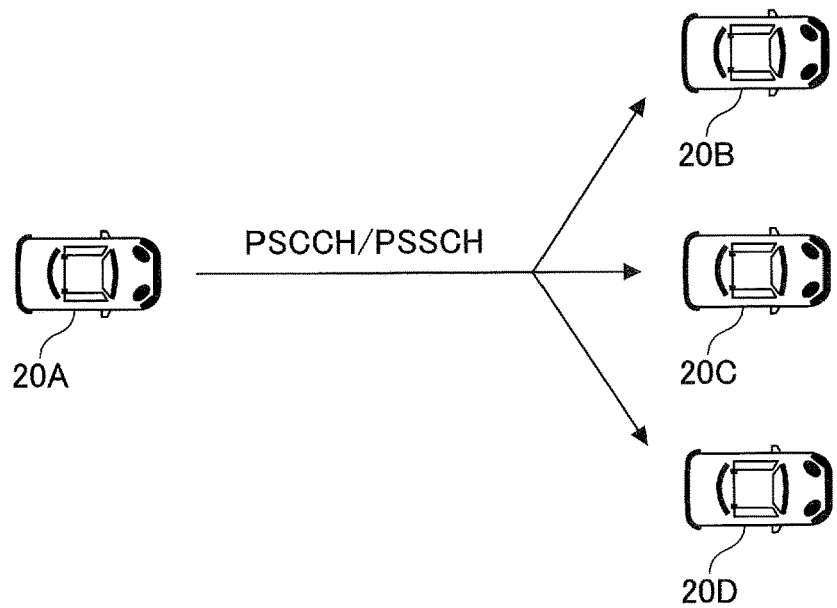
FIG. 9 is a diagram illustrating an example (3) of a communication type of the V2X.

FIG. 9 is a diagram illustrating an example (3) of a communication type for the V2X. The sidelink communication type illustrated in FIG. 9 is a broadcast. The terminal 20A transmits a PSCCH and a PSSCH to one or more terminals 20. In the example illustrated in FIG. 9, the terminal 20A performs a broadcast to the terminals 20B, 20C and 20D. Note that the terminal 20A illustrated in FIGS. 7 to 9 may be referred to as a header UE.

Also, it is assumed in NR-V2X that a HARQ (Hybrid Automatic Repeat Request) is supported for the sidelink unicast and groupcast. In addition, SFCI (Sidelink Feedback Control Information) including a HARQ response is defined in the NR-V2X. In addition, it is being discussed that the SFCI is transmitted via a PSFCH (Physical Sidelink Feedback Channel).

Although the PSFCH is used for sidelink transmission of a HARQ-ACK in descriptions below, it is merely an example. For example, a PSCCH may be used to transmit the sidelink HARQ-ACK, a PSSCH may be used to transmit the sidelink HARQ-ACK or other channels may be used to transmit the sidelink HARQ-ACK.

In the following, information reported by the terminal 20 in HARQs is referred to as the HARQ-ACK in general for convenience. The HARQ-ACK may be referred to as HARQ-ACK information. Also, more specifically, a codebook applied to the HARQ-ACK information reported from the terminal 20 to the base station 10 or the like is referred to as a HARQ-ACK codebook. The HARQ-ACK codebook specifies bit sequences of the HARQ-ACK information. Note that not only ACK but also NACK is transmitted in the HARQ-ACK.

Figure 10:
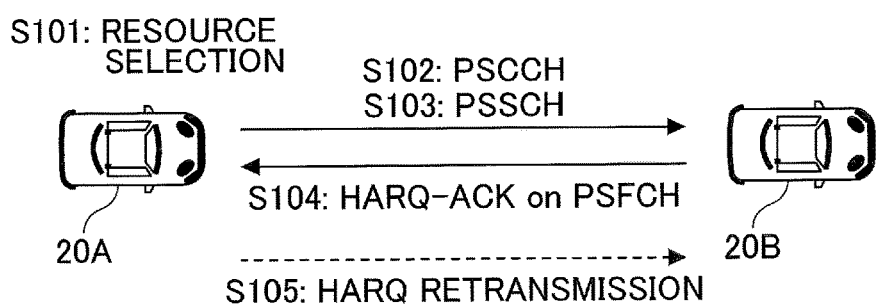
FIG. 10 is a sequence diagram illustrating an operation example (1) of the V2X.

FIG. 10 is a diagram illustrating an example (1) of arrangement and operation of a radio communication system according to an embodiment of the present invention. As illustrated in FIG. 10, the radio communication system according to an embodiment of the present invention has terminals 20A and 20B. Note that although large numbers of user equipment are present in the real world, terminals 20A and 20B are exemplarily illustrated in FIG. 10.

In the following, if the terminals 20A, 20B and the like are not particularly distinguished, they are simply described as "terminal 20" or "user equipment". Although the case where both the terminals 20A and 20B are within a coverage of a cell is illustrated in FIG. 10, the operation according to an embodiment of the present invention may be also applied to the case where the terminal 20B is out of the coverage.

As stated above, in the present embodiment, the terminal 20 is a device installed in a vehicle such as a car, for example, and has cellular communication functions and sidelink functions as a UE in the LTE or the NR. The terminal 20 may be a generic mobile terminal (such as a smartphone). Also, the terminal 20 may be a RSU. The RSU may be a UE type of RSU having UE functions or gNB type of RSU having functions of a base station apparatus.

Note that the terminal 20 is not necessarily a device of a single housing, and in a case where various sensors are distributed and installed in a vehicle, for example, the terminal 20 may be a device including those sensors.

Also, processing contents at the terminal 20 for sidelink transmission data are basically similar to those for UL transmission in the LTE or the NR. For example, the terminal 20 scrambles and modulates a codeword of transmission data to generate complex-valued symbols and maps the complex-valued symbols (transmission signal) to one or two layers for precoding. Then, the terminal 20 maps the precoded complex-valued symbols to a resource element to generate a transmission signal (for example, a complex-valued time-domain SC-FDMA signal), and performs transmission from each antenna port.

Note that the base station 10 has cellular communication functions to serve as a base station for the LTE or the NR, and functions (for example, resource pool configuration, resource allocation or the like) that enable communication with the terminal 20 according to the present embodiment. Also, the base station 10 may be an RSU (a gNB type of RSU).

Also, a signal waveform utilized by the terminal 20 in the SL or the UL in the radio communication system according to an embodiment of the present invention, may be OFDMA, SC-FDMA or others.

At step S101, the terminal 20A autonomously selects a resource used for a PSCCH and a PSSCH from a resource selection window having a predetermined period. The resource selection window may be configured to the terminal 20 by the base station 10.

At steps S102 and S103, the terminal 20A uses the resource autonomously selected at step S101 to transmit SCI (Sidelink Control Information) in a PSCCH and SL data in a PSSCH. For example, the terminal 20A may use a time resource that is the same as a time resource of the PSSCH, and a frequency resource that is adjacent to a frequency resource of the PSSCH, to transmit the SCI (PSCCH).

The terminal 20B receives the SCI (PSCCH) and the SL data (PSSCH) transmitted from the terminal 20A. The SCI received in the PSCCH may include PSFCH resource information used for transmitting by the terminal 20B of a HARQ-ACK in response to reception of the data. The terminal 20A may include information of an autonomously selected resource in the SCI, and transmit the SCI.

At step S104, the terminal 20B uses the PSFCH resource indicated by the received SCI, to transmit the HARQ-ACK for the received data, to the terminal 20A.

At step S105, if the HARQ-ACK received at step S104 indicates a request for retransmission, that is, if it is a NACK (negative response), the terminal 20A retransmits the PSCCH and PSSCH to the terminal 20B. The terminal 20A may use the autonomously selected resource to retransmit the PSCCH and PSSCH.

Note that if the HARQ control is not performed, steps S104 and S105 need not be performed.

Figure 11:
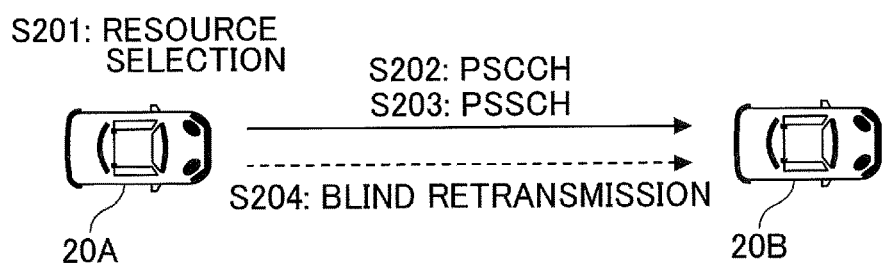
FIG. 11 is a sequence diagram illustrating an operation example (2) of the V2X.

FIG. 11 is a diagram illustrating an example (2) of arrangement and operation of the radio communication system according to an embodiment of the present invention. Blind retransmission that does not rely on the HARQ control, may be performed so as to improve a transmission success rate or a reachable distance.

At step S201, the terminal 20A autonomously selects a resource to be used for a PSCCH and a PSSCH, from a resource selection window having a predetermined period. The resource selection window may be configured to the terminal 20 by the base station 10.

At steps S202 and S203, the terminal 20A uses the resource autonomously selected at step S201 to transmit SCI via the PSCCH and SL data via the PSSCH. For example, the terminal 20A may use a time resource that is the same as a time resource of the PSSCH, and a frequency resource that is adjacent to a frequency resource of the PSSCH, to transmit the SCI (PSCCH).

At step S204, the terminal 20A uses the resource autonomously selected at step S201 to retransmit the SCI via the PSCCH and the SL data via the PSSCH to the terminal 20B. The retransmission at step S204 may be performed multiple times.

Note that if the blind retransmission is not performed, step S204 need not be performed.

Figure 12:
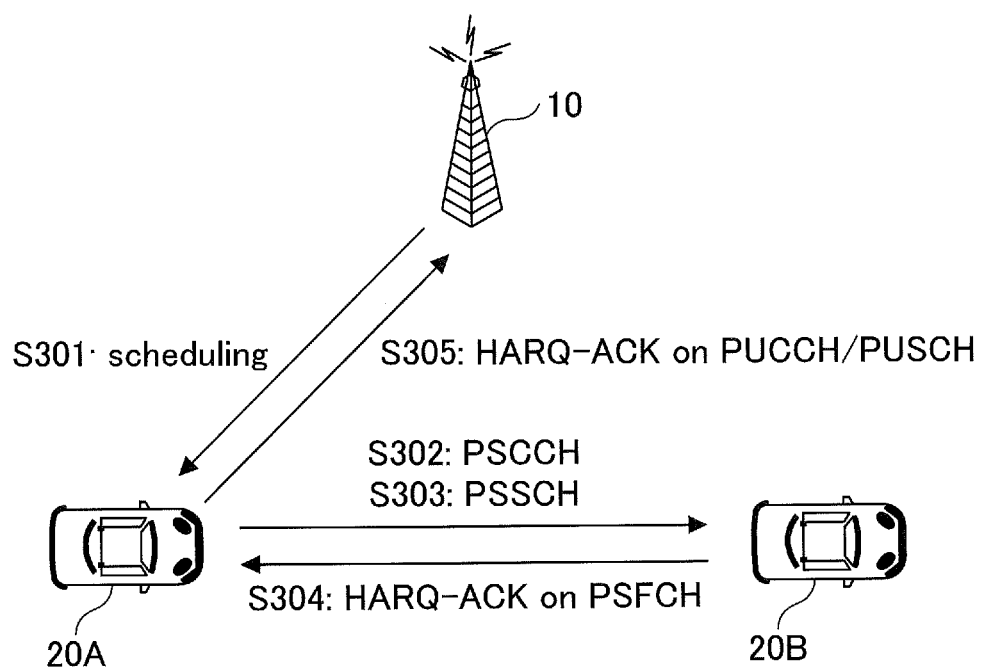
FIG. 12 is a is a sequence diagram illustrating an operation example (3) of the V2X.

FIG. 12 is a diagram illustrating an example (3) of arrangement and operation of the radio communication system according to an embodiment of the present invention. The base station 10 may perform sidelink scheduling. That is, the base station 10 may determine a resource to be used for sidelink by the terminal 20, and transmit information indicative of the resource to the terminal 20. In addition, if the HARQ control is applied, the base station 10 may transmit information indicative of a PSFCH resource to the terminal 20.

At step S301, the base station 10 performs an SL scheduling for the terminal 20A by transmitting DCI (Downlink Control Information) in a PDCCH. Hereinafter, for convenience, the DCI for the SL scheduling is referred to as SL scheduling DCI.

Also, at step S301, it is assumed that the base station 10 also transmits, for the terminal 20A, the DCI for a DL scheduling (may be referred to as DL allocation) in the PDCCH. Hereinafter, for convenience, the DCI for the DL scheduling is referred to as DL scheduling DCI. Upon receiving the DL scheduling DCI, the terminal 20A uses a resource indicated by the DL scheduling DCI to receive DL data in a PDSCH.

At steps S302 and S303, the terminal 20A uses a resource indicated by the SL scheduling DCI to transmit SCI (Sidelink Control Information) in a PSCCH and SL data in a PSSCH. Note that only a resource of the PSSCH may be indicated by the SL scheduling DCI. In this case, for example, the terminal 20A may use a time resource that is same as a time resource of the PSSCH, and a frequency resource that is adjacent to a frequency resource of the PSSCH, to transmit the SCI (PSCCH).

The terminal 20B receives the SCI (PSCCH) and SL data (PSSCH) transmitted from the terminal 20A. The SCI received in the PSCCH includes information regarding a resource of a PSFCH for transmitting a HARQ-ACK in response to reception of the data from the terminal 20B.

The information regarding the resource is included in the DL scheduling DCI or the SL scheduling DCI transmitted from the base station 10 at step S301, and the terminal 20A acquires the information regarding the resource from the DL scheduling DCI or the SL scheduling DCI, and the terminal 20A includes the acquired information in the SCI. Alternatively, the information regarding the resource need not be included in the DCI transmitted from the base station 10, and the terminal 20A may autonomously include the information regarding the resource in the SCI, and transmit the SCI.

At step S304, the terminal 20B uses a resource of the PSFCH indicated by the received SCI to transmit a HARQ-ACK in response to the received data to the terminal 20A.

At step S305, the terminal 20A transmits the HARQ-ACK at a timing (for example, a timing in unit of slot) indicated by the DL scheduling DCI (or the SL scheduling DCI), by using a PUCCH (Physical Uplink Control Channel) resource indicated by the DL scheduling DCI (or the SL scheduling DCI), and the base station 10 receives the HARQ-ACK. A codebook of the HARQ-ACK may include: the HARQ-ACK received from the terminal 20B; and the HARQ-ACK in response to DL data. Note that the HARQ-ACK in response to the DL data need not be included in the case where, for example, no DL data is allocated.

Note that if HARQ control is not performed, steps S304 and S305 need not be performed.

Figure 13:
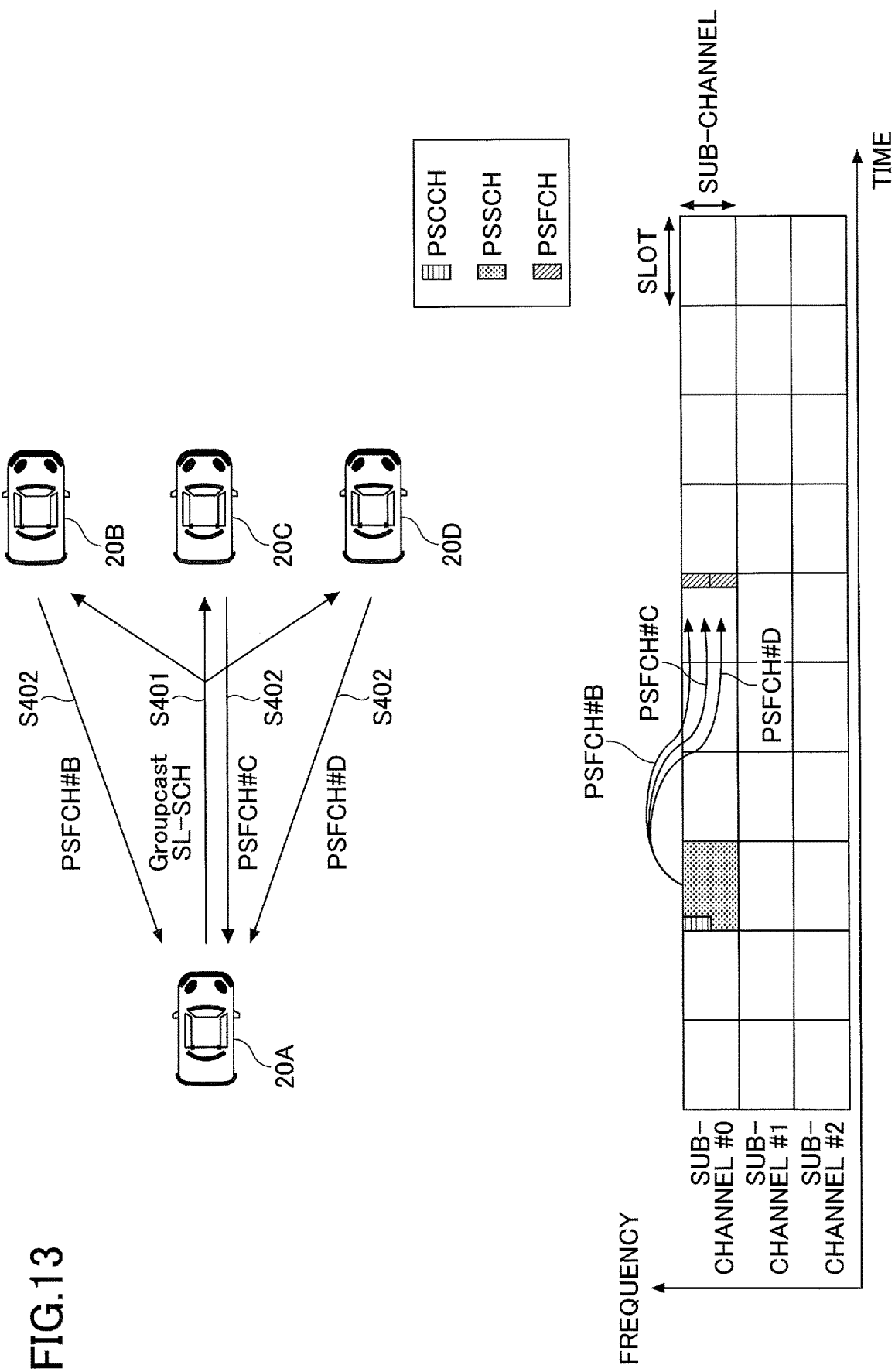
FIG. 13 is a sequence diagram illustrating an operation example (4) of the V2X.

FIG. 13 is a diagram illustrating an operation example (4) according to an embodiment of the present invention. As stated above, transmission of the HARQ response via the PSFCH is supported in the NR sidelink. Note that a format similar to PUCCH (Physical Uplink Control Channel) format 0 is available as the PSFCH format. In other words, in the PSFCH format, the PRB (Physical Resource Block) size is equal to 1, and the ACK and the NACK may be a sequence based format that can be differentiated based on the sequence difference. The PSFCH format is not limited to the above. A resource of the PSFCH may be placed at the last symbol of a slot, or at multiple symbols at the end of a slot. Also, the cycle N may be configured for the PSFCH resource, or may be specified in advance. The cycle N may be configured or specified in advance, in unit of slot.

In FIG. 13, the vertical axis corresponds to a frequency domain, and the horizontal axis corresponds to a time domain. The PSCCH may be placed at first symbol of a slot, at multiple symbols from the first symbol of a slot, or at multiple symbols from a symbol other than the first symbol of a slot. The PSFCH may be placed at the last symbol of a slot, or at multiple symbols at the end of a slot. In the example illustrated in FIG. 13, three sub-channels are configured in a resource pool, and the two PSFCHs are placed at the third slot from a slot where the PSSCH is placed. The arrows from the PSSCH to the PSFCHs show examples of the PSFCHs associated with the PSSCH.

If the HARQ response in NR-V2X groupcast is option 2 of transmitting the ACK or NACK, a resource used for transmission and reception of the PSFCH, must be determined. As illustrated in FIG. 13, at step S401, the terminal 20A serving as the transmitting terminal 20 performs groupcast to the terminals 20B, 20C and 20D serving as the receiving terminals 20, via an SL-SCH. Then, at step S402, the terminal 20B, 20C and 20D use a PSFCH #B, a PSFCH #C, and a PSFCH #D, respectively, to transmit the HARQ responses to the terminal 20A. Here, as illustrated in the example in FIG. 13, if the number of available PSFCH resources is less than the number of receiving terminals 20 belonging to a group, how to allocate the PSFCH resources, must be determined. Note that the transmitting terminal 20 may acquire the number of receiving terminals 20 in the groupcast.

As stated above, the SL-CSI report is supported in Release 16 NR-SL. A CSI request field triggers the SL-CSI report. Upon the SL-CSI report being requested, the terminal 20 may perform measurement and transmit the SL-CSI report to the requesting terminal 20 via a MAC-CE (Media Access Control-Control Element).

Details of the SL-CSI report is further discussed. For example, the timing of the CSI report is not currently determined, and accordingly the time limit from the CSI request to the CSI report must be specified. If the CSI report is delayed, subsequent data transmission may be delayed.

Thus, a latency bound for specifying the time limit before which the SL-CSI report is to be transmitted, is discussed. For example, the terminal 20B that receives the CSI request from the terminal 20A one or more times uses a predetermined SL-CSI-RS to measure a CSI and transmit the CSI measured before the latency bound to the terminal 20A.

Figure 14:
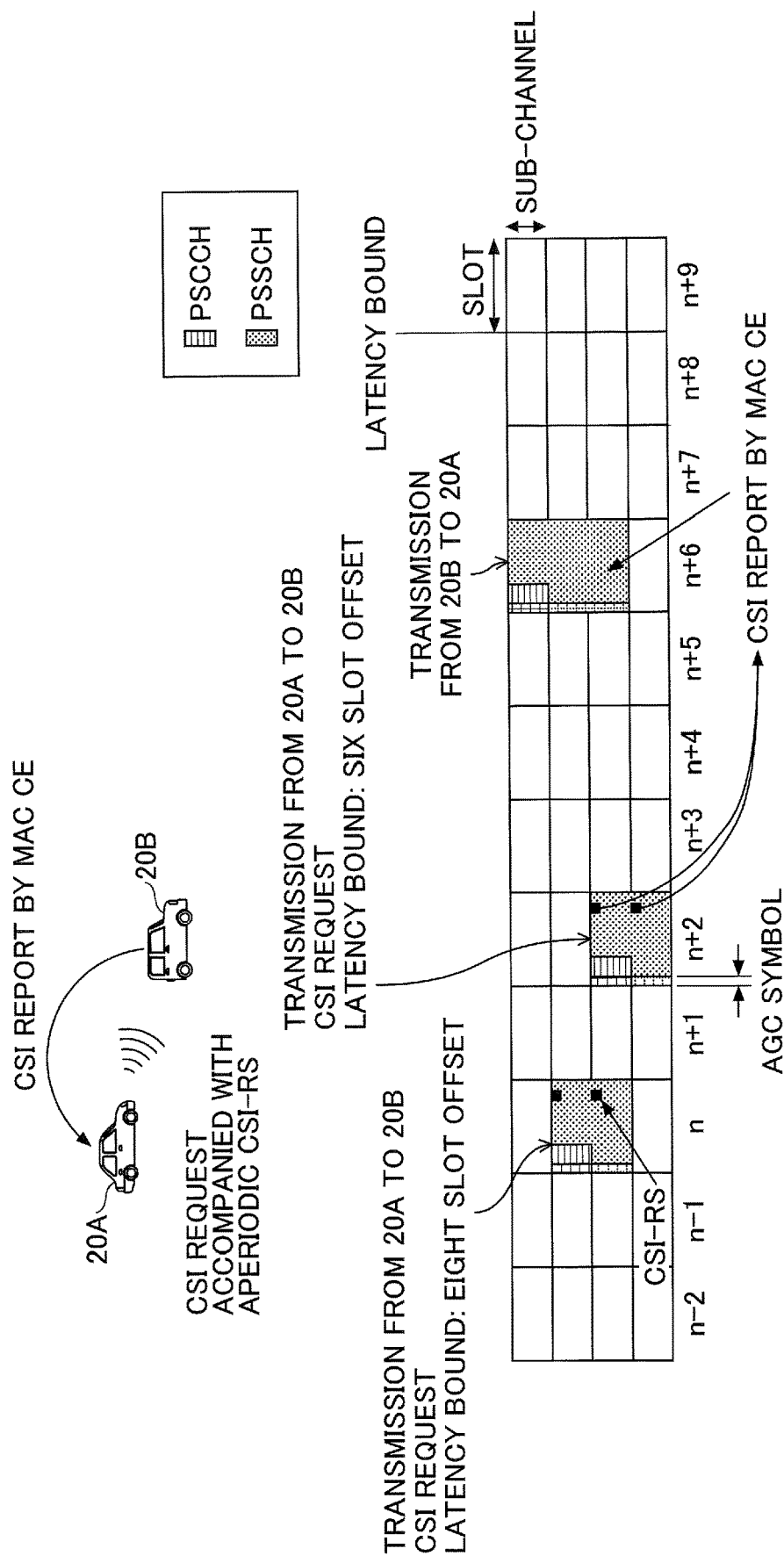
FIG. 14 is a diagram illustrating an example of a measurement report (1) according to an embodiment of the present invention.

FIG. 14 is a diagram illustrating an example of measurement report (1) according to an embodiment of the present invention. A CSI reference resource may be an SL-CSI-RS transmitted in a PSSCH associated with the SCI where a CSI request is transmitted. For example, the SL-CSI-RS in the same slot as the SCI where the CSI request has been transmitted may be the CSI reference resource associated with the CSI request.

As illustrated in FIG. 14, the terminal 20A transmits the SCI including the CSI request via a PSCCH, and the SL-CSI-RS is transmitted in a PSSCH corresponding to the PSCCH. The CSI request implicitly indicates that the CSI-RS is transmitted. The terminal 20B performs CSI measurement from the received SL-CSI-RS and reports the CSI based on the result to the terminal 20A via a MAC layer, that is, a MAC-CE. Note that the CSI request illustrated in FIG. 14 uses an aperiodic CSI-RS. Also, in SL transmission illustrated in FIG. 14, the same symbol as the second symbol is transmitted in the first symbol. These symbols may be referred to as AGC (Automatic Gain Control) symbols. Note that the types of CSI request, indication of the CSI-RS, the CSI report, CSI-RS, are not limited to the above.

For example, as illustrated in FIG. 14, information regarding the latency bound corresponding to the CSI request may be indicated from the terminal 20A to the terminal 20B. The terminal 20A may explicitly or implicitly indicate the latency bound to the terminal 20B via the SCI. The latency bound may be indicated as an offset from a reference of a signal associated with the SCI (for example, the SCI, the corresponding PSCCH, the corresponding PSSCH or the like). The unit of the offset may be a slot, a microsecond or other units indicative a period, for example.

Also, for example, as illustrated in FIG. 14, with respect to multiple specific CSI requests, information indicative of the same timing of the latency bound, may be indicated via the SCI corresponding to each of the multiple CSI requests. The multiple specific CSI requests may correspond to the same CSI report event. For example, the CSI report event may be an event associated with an event associated with a single aperiodic CSI reporting, an event associated with a single periodic CSI reporting or an event associated with a single semi-persistent CSI reporting. Alternatively, for example, the CSI report event may be an event associated with a CSI report associated with a single CSI type or an event associated with a CSI report associated with a single CSI reporting setting.

In the example in FIG. 14, the latency bound is indicated as an eight-slot offset in the SCI corresponding to the CSI request transmitted in slot n, and accordingly the latency bound is slot n+8. With respect to the above, the latency bound is indicated as six-slot offset in the SCI corresponding to a CSI request transmitted in slot n+2, and accordingly the latency bound is slot n+8, which is the same timing as the latency bound indicated in slot n.

Here, for example, an offset from the preconfigured latency bound may be indicated via the SCI corresponding to a CSI request. For example, if the preconfigured latency bound is an eight-slot offset and the latency bound of the CSI request is to be specified as n+8 slots, zero slot may be indicated as the offset value from the preconfigured latency bound in the SCI corresponding to the CSI request transmitted in slot n. Also, two slots may be indicated as a negative offset value from the preconfigured latency bound in the SCI corresponding to the CSI request transmitted in slot n+2. By receiving the two slots as the offset value in slot n+2, the terminal 20B may determine that the latency bound of the CSI request is (n+2)+8−2=n+8 slots.

Also, for example, a change of the latency bound may be indicated for a certain CSI reporting event. For example, in the example in FIG. 14, the latency bound may be indicated as a six-slot offset in the SCI corresponding to the CSI request transmitted in slot n, and the latency bound may be indicated as an eight-slot offset in the SCI corresponding to the CSI request transmitted in slot n+2.

Also, the latency bound may be preconfigured, may be configured in an RRC signaling from the base station 10, may be configured in an RRC signaling between terminals 20, or may be overwritten by SCI.

Note that the start point of the latency bound may be a CSI request transmission or reception timing, a start timing of a CSI reporting event or a certain (for example, the first or the last) CSI request transmission or reception timing.

Figure 15:
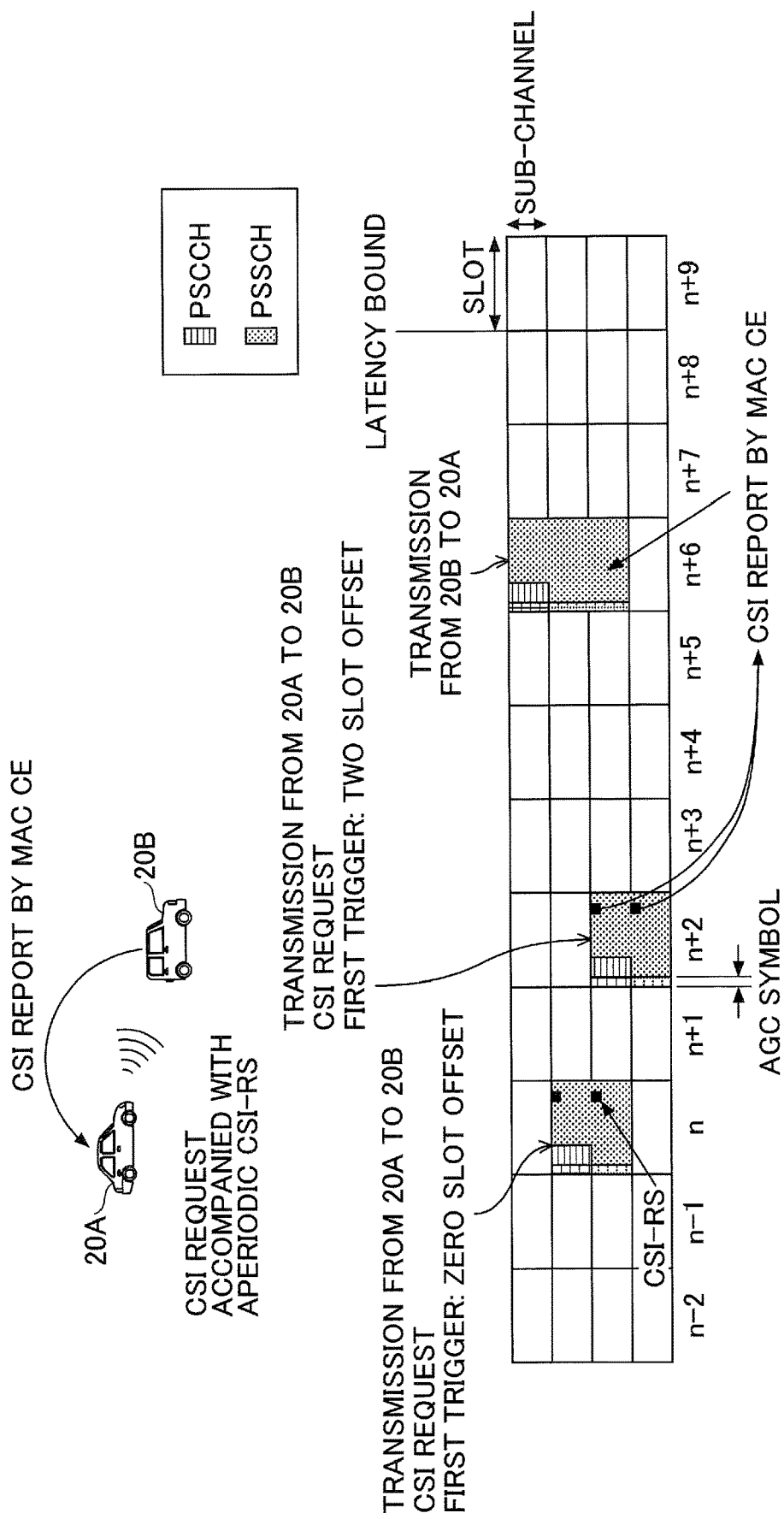
FIG. 15 is a diagram illustrating an example of a measurement report (2) according to an embodiment of the present invention.

FIG. 15 is a diagram illustrating an example of measurement report (2) according to an embodiment of the present invention. For one or more specific CSI requests, information regarding the specific CSI requests may be transmitted together with each CSI request. The one or more specific CSI requests may be multiple CSI requests corresponding to the same CSI reporting event. The information regarding the specific CSI requests may be information regarding the first CSI request, for example.

For the information regarding the specific CSI request, an offset from the timing of the first CSI request may be indicated, for example. As illustrated in FIG. 15, together with the first CSI request of slot n, a zero-slot offset from the first trigger may be indicated, or a two-slot offset from the first trigger may be indicated together with the CSI request of slot n+2. The unit of the offset may be a slot, a microsecond or other units indicative of the period.

Also, the information regarding the specific CSI request may be a slot number of the first CSI request, for example. In FIG. 15, the slot number of the first CSI request may be "slot n". Also, the information regarding the specific CSI request may be information indicating whether it is the first CSI request, for example. In FIG. 15, the CSI request transmitted in slot n may be accompanied with information indicating that it is the first CSI request, or the CSI request transmitted in slot n+2 may be accompanied with information indicating that it is not the first CSI request.

Also, a CSI report event number and/or a CSI new trigger indicator may be transmitted from the terminal 20A to the terminal 20B via an SCI. The CSI report event number may be a number for identifying the CSI report event. The CSI new trigger indicator may be a bit to be toggled for the case where the associated CSI request is a new CSI report event.

In the case of any one of 1) and 2) below, the terminal 20 may consider the CSI request to be for the same CSI report event that has already been initiated before.

1) The CSI new trigger indicator accompanied with a CSI request is not toggled from the CSI new trigger indicator in a previous SCI having the same CSI report event number.

2) The CSI new trigger indicator accompanied with a CSI request is not toggled from the CSI new trigger indicator in a previous SCI.

Also, in cases of any one of 3) to 6) below, the terminal 20 may consider the CSI request to be a new CSI report event and initiate the CSI report event.

3) The CSI new trigger indicator accompanied with a CSI request is toggled from a CSI new trigger indicator in a previous SCI having the same CSI report event number.

4) The CSI new trigger indicator accompanied with a CSI request is toggled from the CSI new trigger indicator in a previous SCI.

5) The CSI report event for a previous SCI having the same CSI report event number as a CSI request has not occurred.

6) The CSI report event has not occurred.

A CSI reference resource may be determined based on at least one of 1) to 6) above.

As stated above, information indicative of the latency bound corresponding to a CSI request is indicated from the terminal 20A to the terminal 20B, and accordingly the latency bound for the CSI report can be properly configured and managed.

Also, the CSI report may be controlled based on a HARQ feedback. For example, the CSI request may be transmitted from the terminal 20A to the terminal 20B only if the HARQ feedback is enabled. In the case were the CSI report is controlled based on the HARQ feedback (for example, if the CSI request is transmitted from the terminal 20A to the terminal 20B only in the case where the HARQ feedback is enabled), operations illustrated in 1) to 5) below may be performed.

1) If the HARQ feedback is enabled, it may be enabled with a configuration, with a pre-configuration or based on a SCI.

2) If the terminal 20A receives a HARQ-ACK from the terminal 20B in the corresponding PSFCH, the terminal 20A may determine that the CSI request is successful and a CSI report event is initiated. Note that if the received HARQ feedback is ACK or NACK, it may be determined that the CSI request is successful and the CSI report event has been initiated, and if the received HARQ feedback is ACK, it may be determined that the CSI request is successful and the CSI report event has been initiated. That is, if the terminal 20A does not receive a HARQ feedback in the corresponding PSFCH, the terminal 20A may determine that the CSI request is unsuccessful and the CSI report event has not been initiated. Also, if the terminal 20A receives a HARQ feedback of NACK in the corresponding PSFCH, it may be determined that the CSI request is unsuccessful and the CSI report event has not been initiated.

3) The start point of the latency bound may be a transmission or reception timing of a CSI request, a transmission or reception timing of a HARQ feedback or a start timing of a CSI report event.

4) If multiple PSFCH transmissions having the same priority overlap with each other, the PSFCH for transmitting the HARQ feedback corresponding to a CSI request may be prioritized.

5) If the terminal 20B receiving a CSI request has failed to transmit a HARQ response to the terminal 20A due to overlapping of channel transmissions or the like, the CSI report event corresponding to the CSI request need not be initiated.

As stated above, the terminal 20A can determine whether the CSI request is successful based on the HARQ feedback transmitted from the terminal 20B.

According to the above-stated embodiments, information indicative of the latency bound corresponding to the CSI request is indicated from the terminal 20A to the terminal 20B, and accordingly the latency bound for the CSI report can be properly configured and managed. Also, the terminal 20A can determine whether the CSI request is successful based on the HARQ feedback transmitted from the terminal 20B.

That is, the timing of reporting measurement results can be clarified in a radio communication system.

(Device Arrangement)

Next, example functional arrangements of the base station 10 and the terminal 20 that perform operations and actions as stated above are described. The base station 10 and the terminal 20 include functions of implementing the above-stated embodiments. Note that the base station 10 and the terminal 20 each may have only a portion of the functions of the embodiments.

<Base Station 10>

Figure 16:
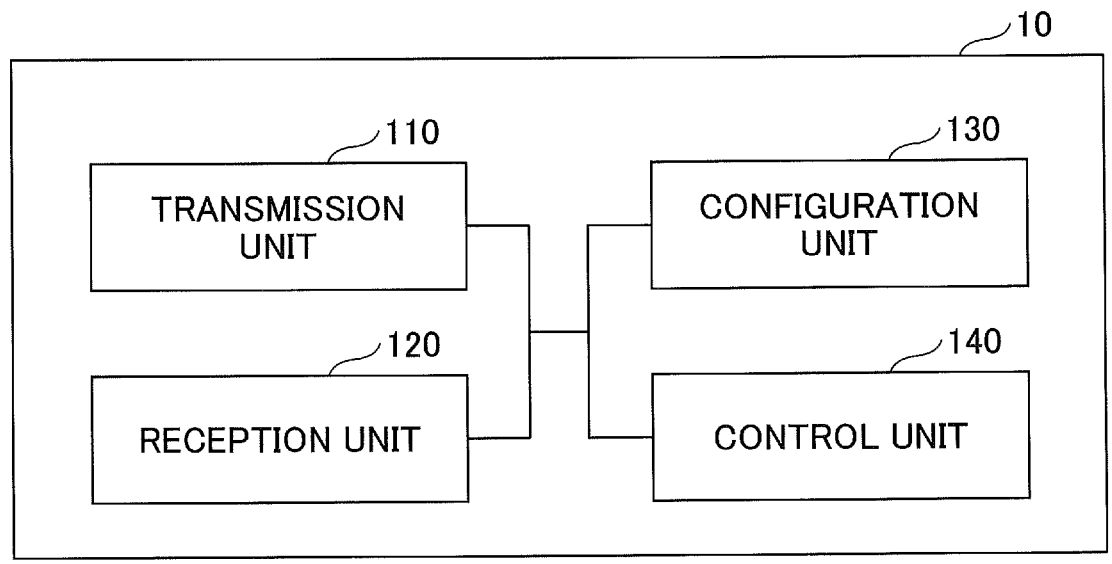
FIG. 16 is a diagram illustrating an example of functional configuration of a base station 10 according to an embodiment of the present invention.

FIG. 16 illustrates an example functional arrangement of the base station 10. As shown in FIG. 16, the base station 10 includes a transmission unit 110, a reception unit 120, a configuration unit 130 and a control unit 140. The functional arrangement shown in FIG. 16 is only one example. The functional separation and the names of the functional units may be arbitrary as long as operations according to the present embodiment can be achieved.

The transmission unit 110 includes a function of generating a signal for transmission to the side of the terminal 20 and wirelessly transmitting the signal. The reception unit 120 includes a function of receiving various signals transmitted from the terminal 20 and acquiring information for upper layers from the received signals, for example. Also, the transmission unit 110 includes a function of transmitting an NR-PSS, an NR-SSS, an NR-PBCH, a DL/UL control signal, a DL reference signal or the like to the terminal 20.

The configuration unit 130 stores preconfigured configurations and various configurations for transmission to the terminal 20 in a memory device and reads them from the memory device as needed. Contents of the configurations may be information associated with configurations of D2D information or the like, for example.

The control unit 140 performs operations associated with configurations for the terminal 20 to perform D2D communication as stated in conjunction with the embodiments. Also, the control unit 140 transmits a scheduling for D2D communication and DL communication to the terminal 20 via the transmission unit 110. Also, the control unit 140 receives information associated with a HARQ acknowledgement for D2D communication and DL communication from the terminal 20 via the reception unit 120. The functional portions of the control unit 140 related to signal transmission may be included in the transmission unit 110, and the functional portions of the control unit 140 related to signal reception may be included in the reception unit 120.

<Terminal 20>

Figure 17:
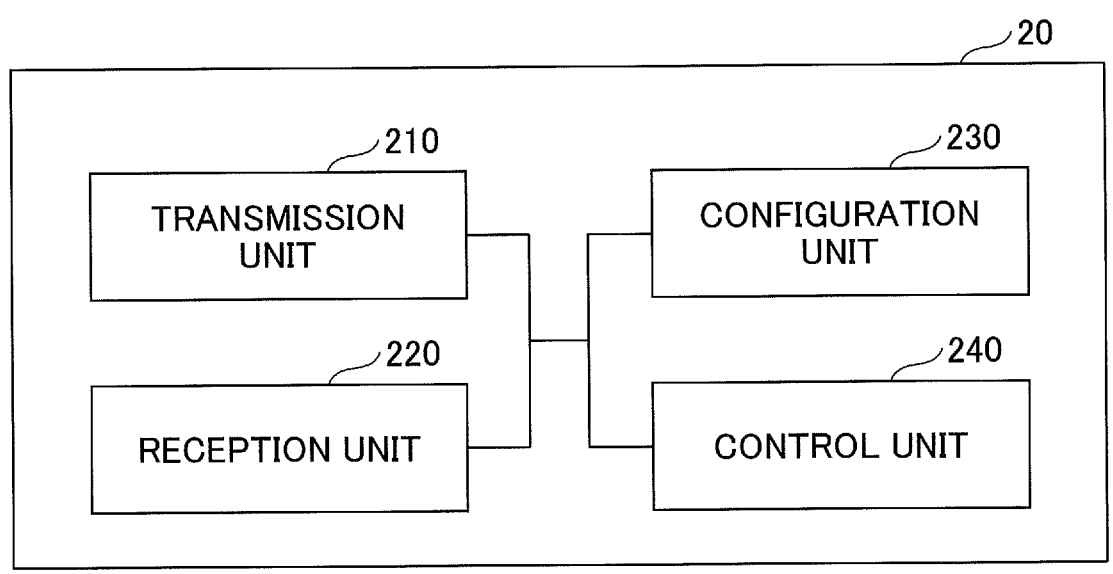
FIG. 17 is a diagram illustrating an example of functional configuration of a terminal 20 according to an embodiment of the present invention.

FIG. 17 is a diagram illustrating one example functional arrangement of the terminal 20 according to an embodiment of the present invention. As illustrated in FIG. 17, the terminal 20 has a transmission unit 210, a reception unit 220, a configuration unit 230 and a control unit 240. The functional arrangement shown in FIG. 17 is only one example. The functional separation and the names of the functional units may be arbitrary as long as operations according to the present embodiment can be achieved.

The transmission unit 210 generates a transmission signal from transmission data and wirelessly transmits the transmission signal. The reception unit 220 wirelessly receives various signals and acquires signals for upper layers from the received physical layer signals. Also, the reception unit 220 has a function of receiving an NR-PSS, an NR-SSS, an NR-PBCH, a DL/UL/SL control signal or a reference signal and so on transmitted from the base station 10. Also, for example, as D2D communication, the transmission unit 210 transmits a PSCCH (Physical Sidelink Control Channel), a PSSCH (Physical Sidelink Shared Channel), a PSDCH (Physical Sidelink Discovery Channel), a PSBCH (Physical Sidelink Broadcast Channel) or the like to other terminals 20, and the reception unit 220 receives the PSCCH, the PSSCH, the PSDCH, the PSBCH or the like from other terminals 20.

The configuration unit 230 stores various configurations received at the reception unit 220 from the base station 10 or the terminal 20 in a memory device and reads them from the memory device as needed. Also, the configuration unit 230 stores preconfigured configurations. Contents of the configurations may be information associated with configuration of D2D communication and so on, for example.

The control unit 240 controls D2D communication to other terminals 20 as stated above in conjunction with the embodiments. Also, the control unit 240 performs operations associated with a HARQ for D2D communication and DL communication. Also, the control unit 240 transmits information associated with a HARQ acknowledgement for D2D communication and DL communication to other terminal 20 scheduled from the base station 10 to the base station 10. Also, the control unit 240 may perform scheduling for D2D communication for other terminals 20. Also, the control unit 240 may autonomously select a resource for use in D2D communication from a resource selection window. Also, the control unit 240 controls contention of UL transmission and SL transmission. The functional portion of the control unit 240 regarding signal transmission may be included in the transmission unit 210, and the functional portion of the control unit 240 regarding signal reception may be included in the reception unit 220.

(Hardware Arrangement)

The block diagrams (FIGS. 16 and 17) used in describing the above embodiments show blocks of functional units. These functional blocks (components) are implemented by any combination of at least one of hardware and software. In addition, the implementation method of each function block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 18:
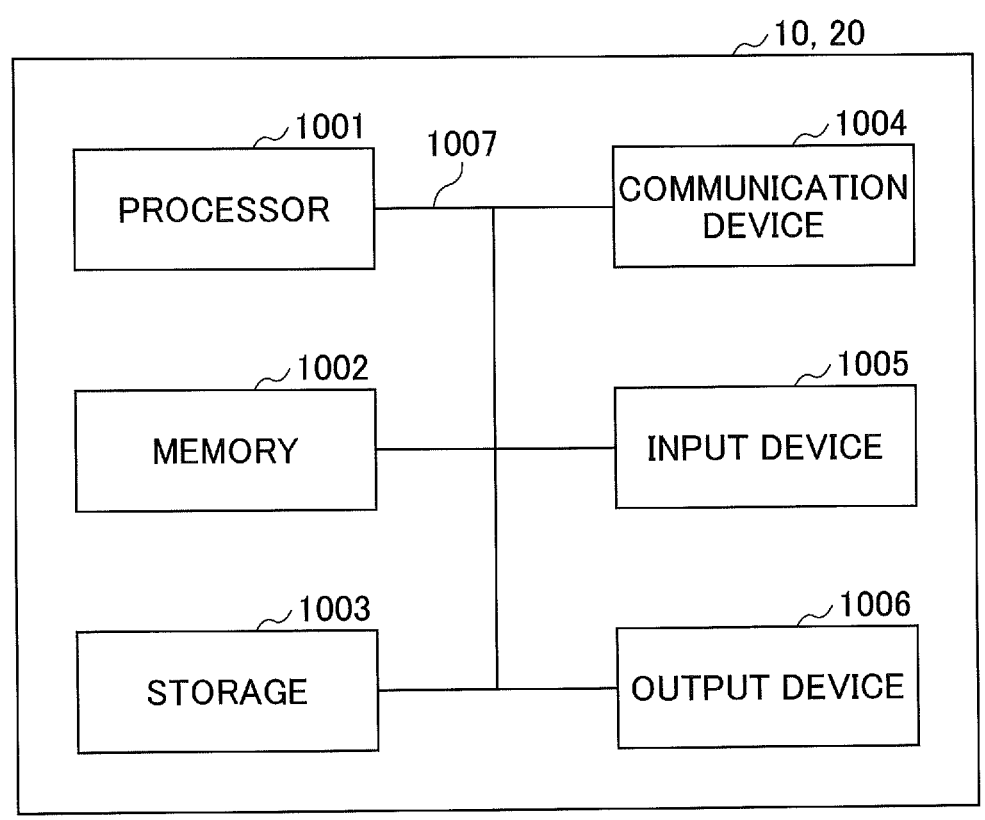
FIG. 18 is a diagram illustrating an example of hardware configuration of the base station 10 or the terminal 20 according to an embodiment of the present invention.

For example, each of the base station 10, the terminal 20 and so on according to one embodiment of the present invention may function as a computer performing operations for a radio communication method according to the present disclosure. FIG. 18 is a diagram illustrating an example of a hardware configuration of the base station 10 and the terminal 20 according to one embodiment of the present disclosure. The base station 10 and the terminal 20 as stated above may be physically configured as a computer device including a processor 1001, a memory 1002, a storage 1003, a communication device 1004, an input device 1005, an output device 1006, a bus 1007, etc.

In the following description, the term "device" can be read as a circuit, a device, a unit, etc. The hardware configuration of the base station 10 and the terminal 20 may be configured to include one or more of the respective devices shown in the figure, or may be configured without some devices.

Each function of the base station 10 and the terminal 20 may be implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, the above-stated control units 140 and 240 or the like may be implemented with the processor 1001.

Additionally, the processor 1001 reads a program (program code), a software module, data, etc., from at least one of the storage 1003 and the communication device 1004 to the memory 1002, and executes various processes according to these. As the program, a program is used which causes a computer to execute at least a part of the operations described in the above-described embodiment. For example, the control unit 140 of the base station 10 shown in FIG. 16 may be implemented by a control program that is stored in the memory 1002 and that is operated by the processor 1001. Also, for example, the control unit 240 of the terminal 20 shown in FIG. 17 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a ROM (Read Only Memory), an EPROM (Erasable Programmable ROM), an EEPROM (Electrically Erasable Programmable ROM), a RAM (Random Access Memory), etc. The memory 1002 may be referred to as a register, a cache, a main memory (main storage device), etc. The memory 1002 may store a program (program code), a software module, etc., which can be executed for implementing the radio communication method according to one embodiment of the present disclosure.

The storage 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, etc. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, etc. The communication device 1004 may be configured to include, for example, a high frequency switch, a duplexer, a filter, a frequency synthesizer, etc., to implement at least one of frequency division duplex (FDD: Frequency Division Duplex) and time division duplex (TDD: Time Division Duplex). For example, a transceiver antenna, an amplification unit, a transceiver unit, a channel interface or the like may be implemented with the communication device 1004. The transceiver unit may have an implementation with the transmission unit and the reception unit that are physically or logically separated.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output toward outside. The input device 1005 and the output device 1006 may be configured to be integrated (e.g., a touch panel).

Each device, such as processor 1001 and memory 1002, is also connected by the bus 1007 for communicating information. The bus 1007 may be formed of a single bus or may be formed of different buses between devices.

Also, the base station 10 and the terminal 20 may include hardware, such as a microprocessor, a digital signal processor (DSP: Digital Signal Processor), an ASIC (Application Specific Integrated Circuit), a PLD (Programmable Logic Device), and a FPGA (Field Programmable Gate Array), which may implement some or all of each functional block. For example, the processor 1001 may be implemented using at least one of these hardware components.

Conclusion of the Embodiments

As stated above, according to an embodiment of the present invention, there is provided a terminal, comprising: a transmission unit that transmits a request for channel state information and one or more shared channels including a reference signal to another terminal; a control unit that configures a latency bound for a channel state report triggered by the request; and a reception unit that receives the channel state report triggered by the request, before the latency bound from the other terminal, wherein the control unit performs at least one of: an operation of controlling the channel state report based on reception of a HARQ (Hybrid Automatic Repeat Request) feedback in a case where the reception unit receives the HARQ feedback corresponding to the request; and an operation of configuring a specific latency bound for each of multiple requests for the channel state information in a case where the transmission unit transmits the multiple requests for the channel state information corresponding to a channel state report event.

According to the above arrangement, information indicative of the latency bound corresponding to a CSI request is indicated from the terminal 20A to the terminal 20B, and accordingly the latency bound for a CSI report can be properly configured and managed. That is, the timing of reporting a measurement result can be clarified in a radio communication system.

If the reception unit receives a HARQ feedback corresponding to a first request for the channel state information, the control unit may determine that a channel state report event associated with the first request for the channel state information has been initiated. According to the above arrangement, the terminal 20A can determine whether a CSI request is successful according to a HARQ feedback transmitted from the terminal 20B.

The control unit may include into at least one of the multiple requests of the channel state information: a slot number of a first request for the channel state information; an offset from the first request for the channel state information; or information indicating whether the request is first channel state information. According to the above arrangement, information indicative of a timing of a first CSI request is indicated from the terminal 20A to the terminal 20B, and accordingly the latency bound for a CSI report can be properly configured and managed.

The control unit may include information for identifying a channel state report event corresponding to a second request for the channel state information into control information corresponding to the second request for the channel state information. According to the above arrangement, information indicative of a CSI report event corresponding to a CSI request is indicated from the terminal 20A to the terminal 20B, and accordingly the latency bound for a CSI report can be properly configured and managed.

The control unit may include information indicating whether a third request for the channel state information is a new channel state report event into control information corresponding to the third request for the channel state information. According to the above arrangement, information indicating whether a CSI report event is new is indicated from the terminal 20A to the terminal 20B, and accordingly the latency bound for a CSI report can be properly configured and managed.

Also, according to an embodiment of the present invention, there is provided a communication method implemented by a terminal, comprising: transmitting a request for channel state information and one or more shared channels including a reference signal to another terminal; configuring a latency bound for a channel state report triggered by the request; and receiving the channel state report triggered by the request, before the latency bound from the other terminal, wherein the configuring includes performing at least one of: an operation of controlling the channel state report based on reception of a HARQ (Hybrid Automatic Repeat Request) feedback in a case where the receiving includes receiving the HARQ feedback corresponding to the request; and an operation of configuring a specific latency bound for each of multiple requests for the channel state information in a case where the transmitting includes transmitting the multiple requests for the channel state information corresponding to a channel state report event.

According to the above arrangement, information indicative of the latency bound corresponding to a CSI request is indicated from the terminal 20A to the terminal 20B, and accordingly the latency bound for a CSI report can be properly configured and managed. That is, the timing of reporting a measurement result can be clarified in a radio communication system.

Supplemental Embodiments

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station 10 and the terminal 20 have been described with the use of the functional block diagrams, but these apparatuses may be implemented by hardware, software, or a combination thereof. Each of software functioning with a processor of the base station 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (a MIB (Master Information Block) and a SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also, a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an example order and the methods are not limited to the specific orders presented.

The specific operations performed by the base station 10 described in the present disclosure may in some cases be performed by an upper node. It is clear that, in a network that includes one or more network nodes including the base station 10, various operations performed for communication with the terminal 20 can be performed by at least one of the base station 10 and another network node other than the base station 10 (for example, a MME, a S-GW, or the like may be mentioned, but not limited thereto). In the above, the description has been made for the case where another network node other than the base station 10 is a single node as an example. However, the other network node may be a combination of a plurality of other network nodes (for example, an MME and a S-GW).

Information, signals, or the like described in the present disclosure may be output from an upper layer (or a lower layer) to a lower layer (or an upper layer). Information, signals, or the like described in the present disclosure may be input and output via a plurality of network nodes.

Information or the like that has been input or output may be stored at a predetermined location (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Also, software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Also, information, parameters, and the like described in the present disclosure may be expressed by absolute values, may be expressed by relative values with respect to predetermined values, and may be expressed by corresponding different information. For example, radio resources may be indicated by indices.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells. In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication device, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Things) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments 20 (that may be called D2D (Device-to-Device), V2X (Vehicle-to-Everything), or the like). In this case, a user equipment 20 may have above-described functions of the base station 10. In this regard, a word such as "up" or "down" may be replaced with a word corresponding to communication between terminals (for example, "side"). For example, an uplink channel, a downlink channel, or the like may be replaced with a side channel.

Similarly, a user terminal according to the present disclosure may be read as a base station. In this case, a base station may have above-described functions of the user terminal.

The term "determining" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "Determining" may be read as "assuming", "expecting", "considering", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above-described apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of numerology.

The numerology may be a communication parameter that is applied to at least one of transmission and reception of a signal or a channel. The numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in a frequency domain, a specific windowing processing performed by a transceiver in a time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on the numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit for transmitting a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the conventional LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to allocate, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, a normal TTI, a subframe, and the like) may be read as TTI having a time length exceeding 1 ms, and a short TTI (for example, a shortened TTI) may be read as a TTI having a TTI length less than the TTI length of the long TTI and equal to or more than 1 ms.

A resource block (RB) is a resource allocation unit in terms of a time domain and a frequency domain and may include one or a plurality of consecutive subcarriers in terms of frequency domain. The number of subcarriers included in an RB may be the same regardless of the numerology, and, for example, may be 12. The number of subcarriers included in a RB may be determined based on the numerology.

Also, in terms of the time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

Also, a resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for certain numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of configured BWPs may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following the article is of a plural form.

Throughout the present disclosure, an expression that "A and B are different" may mean that "A and B are different from each other". Also, this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

The CSI according to the present disclosure is one example of channel state information. The CSI-RS is one example of a reference signal. The PSSCH is one example of a shared channel. The SCI is one example of control information.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

LIST OF REFERENCE SYMBOLS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Memory
1003 Storage
1004 Communication device
1005 Input device
1006 Output device

The invention claimed is:

1. A terminal, comprising:
a transmission unit that transmits a request for channel state information and one or more shared channels including a reference signal to another terminal;
a control unit that configures a latency bound for a channel state report triggered by the request; and
a reception unit that receives the channel state report triggered by the request, before the latency bound from the other terminal,
wherein the control unit performs at least one of:
an operation of controlling the channel state report based on reception of a HARQ (Hybrid Automatic Repeat Request) feedback in a case where the reception unit receives the HARQ feedback corresponding to the request; and
an operation of configuring a specific latency bound for each of multiple requests for the channel state information in a case where the transmission unit transmits the multiple requests for the channel state information corresponding to a channel state report event.

2. The terminal as claimed in claim 1, wherein in a case where the reception unit receives a HARQ feedback corresponding to a first request for the channel state information, the control unit determines that the channel state report event associated with the first request for the channel state information has been initiated.

3. The terminal as claimed in claim 1, wherein the control unit includes into at least one of the multiple requests for the channel state information:
a slot number of a first request for the channel state information;
an offset from the first request for the channel state information; or
information indicating whether the request is first channel state information.

4. The terminal as claimed in claim 1, wherein the control unit includes information for identifying a channel state report event corresponding to a second request for the channel state information into control information corresponding to the second request for the channel state information.

5. The terminal as claimed in claim 1, wherein the control unit includes information indicating whether a third request for the channel state information is a new channel state report event into control information corresponding to the third request for the channel state information.

6. A communication method implemented by a terminal, comprising:
transmitting a request for channel state information and one or more shared channels including a reference signal to another terminal;
configuring a latency bound for a channel state report triggered by the request; and
receiving the channel state report triggered by the request, before the latency bound from the other terminal,
wherein the configuring includes performing at least one of:
an operation of controlling the channel state report based on reception of a HARQ (Hybrid Automatic Repeat Request) feedback in a case where the receiving includes receiving the HARQ feedback corresponding to the request; and
an operation of configuring a specific latency bound for each of multiple requests for the channel state information in a case where the transmitting includes transmitting the multiple requests for the channel state information corresponding to a channel state report event.

* * * * *